United States Patent [19]
Kehl et al.

[11] Patent Number: 4,796,667
[45] Date of Patent: Jan. 10, 1989

[54] BRAKE PRESSURE CONTROL VALVE

[75] Inventors: Georg Kehl, Stuttgart; Ernst-Dieter Schäfer, Pliezhausen, both of Fed. Rep. of Germany

[73] Assignee: Robert Bosch GmbH, Stuttgart, Fed. Rep. of Germany

[21] Appl. No.: 25,532

[22] Filed: Mar. 13, 1987

[30] Foreign Application Priority Data

Jun. 10, 1986 [DE] Fed. Rep. of Germany ....... 3619482

[51] Int. Cl.⁴ ............................................. B60T 13/12
[52] U.S. Cl. .................................. 137/629; 137/596.1; 251/282
[58] Field of Search .............. 137/614.19, 629, 625.36, 137/330, 596.1; 303/50, 55; 188/358, 359; 251/282, 174

[56] References Cited

U.S. PATENT DOCUMENTS

| | | | |
|---|---|---|---|
| 464,018 | 12/1891 | Goubert | 251/282 X |
| 1,911,785 | 5/1933 | Bailey | 137/625.36 X |
| 2,444,137 | 6/1948 | Main | 137/330 |
| 2,752,947 | 7/1956 | Hruska | 251/282 X |
| 2,880,748 | 4/1959 | Elsey | 137/625.36 X |
| 2,962,039 | 11/1960 | Shand et al. | 251/174 X |
| 3,099,500 | 7/1963 | Anderson | 188/359 X |
| 3,150,687 | 9/1964 | Kalle | 251/282 X |
| 3,153,424 | 10/1964 | Acker et al. | 137/625.36 X |
| 3,669,513 | 6/1972 | Smith | 303/50 |

*Primary Examiner*—Martin P. Schwadron
*Assistant Examiner*—Stephen M. Hepperle
*Attorney, Agent, or Firm*—Edwin E. Greigg

[57] ABSTRACT

The invention relates to a brake pressure control valve which contains a brake pressure build-up valve. The brake pressure build-up valve comprises a pressure compensated seat valve. A second valve member, a rod between the two valve members and a tubular compensating piston are provided to produce pressure compensation at the valve member. The compensating piston which encloses the rod is displaceable relative to the latter and comprises a second valve seat at its end directed towards the second valve member. A sealing ring also encloses the tubular compensating piston. When the first valve member is raised from its valve seat, the second valve member can precede the tubular compensating piston, thereby preventing friction forces between this compensating piston and its sealing ring from being disruptive during opening of the seat valve. Also provided is a valve slide which only uncovers flow bores when the seat valve is opened for the purpose of increasing brake pressure. Brake pressures can be smoothly controlled by means of the control slide.

5 Claims, 2 Drawing Sheets

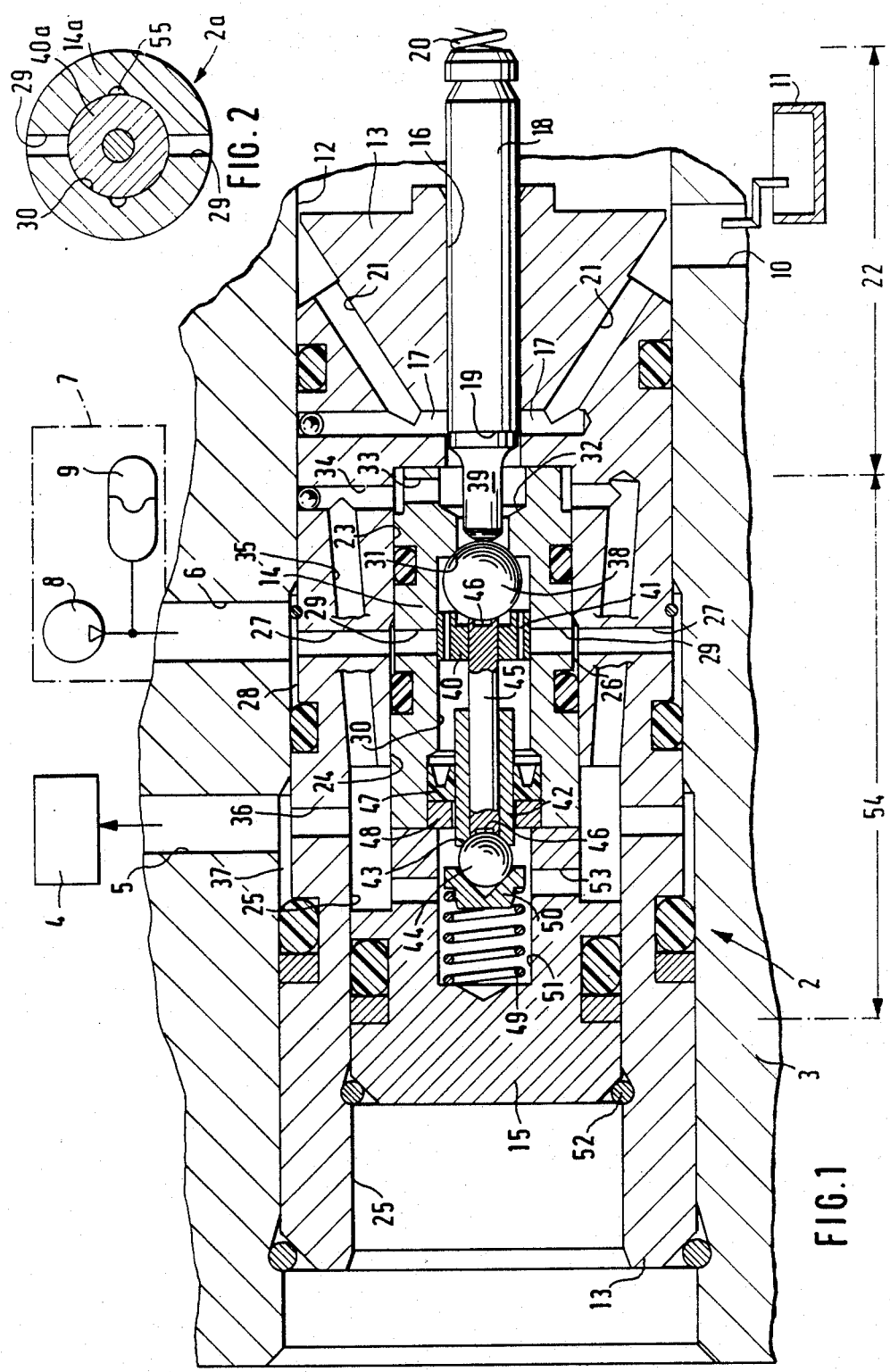

BRAKE PRESSURE CONTROL VALVE

BACKGROUND OF THE INVENTION

The invention relates to a brake pressure control valve as defined hereinafter. SAE paper 840 465 discloses a brake pressure control valve which incorporates both a brake pressure reduction valve and a pressure build-up valve. The brake pressure build-up valve comprises a valve chamber which has an inner valve seat and which is designed for connection to a pressure source, a valve member which is movable in the valve chamber and which is at least partially spherical in shape, a compensating piston coupled to the valve member and a seal which seals the compensating piston relative to the valve chamber and also a closing spring. The compensating piston and the valve member are oppositely influenced by the pressure from the pressure source and thus relatively minor force is required to raise the valve member from the valve seat. The disadvantage is that as the valve member is being raised from and moved back to this valve seat friction forces are produced between the compensation piston and its seal. These friction forces impede the smooth raising and lowering of the valve member and accordingly the smooth apportioning of brake pressures. Smooth apportioning of brake pressures is further impeded in that even minor lifting of the valve member results in large valve opening cross-sections.

OBJECT AND SUMMARY OF THE INVENTION

The advantage of this invention over the prior art is that no disruptive friction forces are produced at the pressure build-up valve while the valve member is being raised from its valve seat.

The measures described herein represent advantageous developments of and improvements to the brake pressure control valve described in this application.

A further advantage of this invention is that the brake pressure control valve may be inexpensively produced.

Another advantage of the invention is to provide an improved seal.

Yet another feature of this invention is to facilitate smoother apportioning of brake pressures.

Further revelations of this invention can also be implemented without the utilization of each and every feature disclosed.

Additional advantages revealed herein are the use of individual construction features such as providing bores which extend through the control slide as well as a longitudinal groove being incorporated in the cylindrical bore.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 is a longitudinal cross sectional view of a first embodiment,

FIG. 2 is a cross-sectional view of an individual feature of a second embodiment of the invention, and, FIG. 3 shows in a cross sectional view a third embodiment of the invention.

DESCRIPTION OF THE PREFERRED EMBODIMENTS

Figure 3:
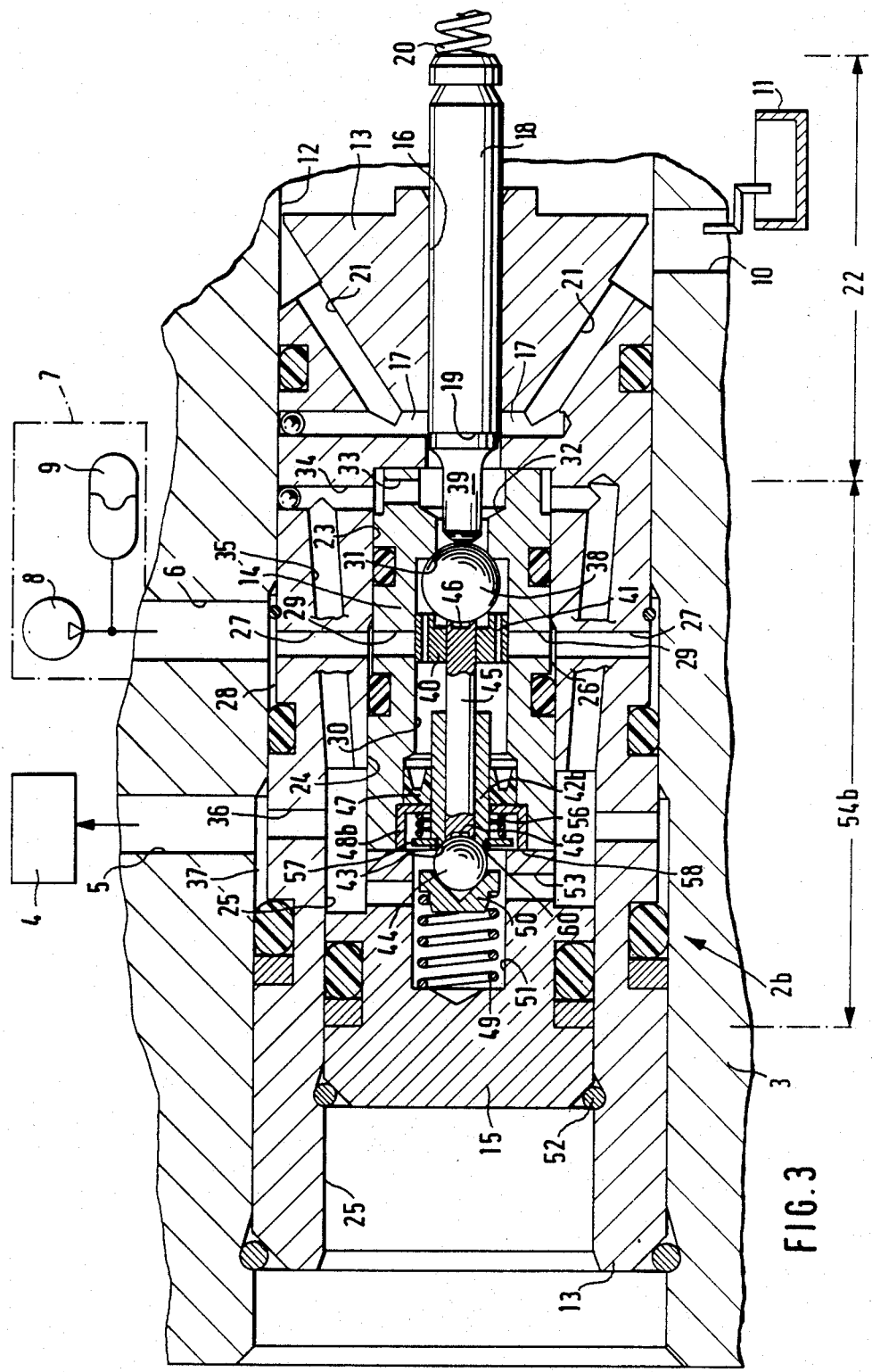

The brake pressure control valve shown in FIG. 1 is housed in a housing 3. The housing may possibly also contain a braking force amplifier (not shown) and be directly connected to a wheel brake 4. For this purpose the housing 3 is provided with a connection bore 5. Another connection bore 6 is connected to a pressure source 7. This pressure source 7 can be of the state of the art and comprises at least a pump 8 and a pressure storage element 9. Another connection bore 10 is connected to a pressure medium storage container 11 from which the pressure source 7 is supplied.

The housing 3 has a stepped bore 12 which receives the brake pressure control valve 2. The brake pressure control valve 2 comprises a first sleeve-like component 13, which receives a second sleeve-like component 14 and a third component 15. At one end, the sleeve-like component 13 has a coaxially oriented cylindrical bore 16 and at least one control bore 17 disposed at right angles thereto, thereby forming a rigid control sleeve. A control slider 18 is displaceable in the bore 16. The control slider 18 has a control edge 19. The control slider 18 can be moved by means of a brake pedal (not shown) via a path simulator spring 20 (shown) so that its control edge 19 passes the control bores 17 and the control slider 18 thereby closes these control bores 17. When the control slider 18 is moved from the locking position described, back into the starting position shown, the control bores 17 are partially freed. As a result, connections are thereby produced between the cylindrical bore 16 and the control bores 17 which in turn communicate with the connection bore 10 via connection channels 21. Accordingly, when the control slider 18 is in the position indicated there exists a pressure medium outflow path to the pressure medium storage container 11. Thus, in the region of the cylindrical bore 16, the component 13 together with the control slide 18, forms a pressure reduction valve 22.

Adjacent to the cylindrical bore 16 the component 13 comprises another bore 23 which has a larger diameter and to which the bores 24 and 25 with even larger diameters are connected. The component 14 has two outer diameters which are adapted to the diameters of the bores 23 and 24. In the region of transition of the diameters there is an annular area 26 between the component 13 and component 14. Flow bores 27 which discharge into an annular area 28 disposed between the component 13 and the housing 3 extend radially outwards from the annular area 26. The annular area 28 communicates with the connection bore 6. Additional flow bores 29 extending inwardly in a radial direction pass from the annular area 26 through the component 14.

In the region of these flow bores 29 and in a similar axial orientation to the cylindrical bore 16, the component 14 comprises a cylindrical bore 30 such that in the region of this cylindrical bore 30 the component 14 forms a fixed control sleeve. Adjacent to the cylindrical bore 30 is the direction of the cylindrical bore 16 the component 14 comprises a first valve seat 31 and thereby forms a valve chamber. A stepped bore 32, which is open to the cylindrical bore 16, connects to the valve seat 31. This stepped bore 32 communicates with the bore 25 via at least one of the radial bores 33 extending through the component 14 and one of the radial bores 34, 35 which extends through component 13. At least one bore 36 which communicates with the connection bore 5 via an annular area 37 disposed between component 13 and the housing 3 extends in a radial direction from the bore 25. A first valve member 38 is provided for the valve seat 31. This member consists, for example, of a ball. A control lug 39 is provided on the control slide 18 and extends in the direction of the ball. The length of the control lug 39 is calculated such that when the control slide 18 is moved in the direction of the ball 38 the control lug 39 only closes the control bore 17 when partial chambers disposed within the bore 30 and connected by a compensating channel 41 are hydraulically relieved when the ball 38 is slightly raised from its valve seat 31. A cylindrical control slide 40 is united to the ball 38. When the ball 38 has opened its valve seat 31 this control slide 40 still closes the flow bores 29. These flow bores 29 are advantageously so oriented with respect to the cylindrical bore 30 that during operation virtually no disruptive radial forces influence the cylindrical control slide 40. In the case of the present embodiment this is achieved in that the bores 29 lie on a common axis which passes through the longitudinal axis of the cylindrical bore 30. The control slide 40 contains at least the one pressure compensating channel 41. Accordingly, as indicated, the partial chambers located on each side of the control slide 40 within the cylindrical bore 30 communicate with one another.

On the same axis as the first valve seat 31 there is provided a tubular compensating piston 42 which is spaced apart from the control slide 40 and which is movable with respect thereto. This compensating piston 42 projects out of the component 14 and is there provided with a second valve seat 43. A second valve member 44 is provided for this valve seat 43. This second valve member 44 is also in the form of a ball and is connected to the first valve member 38 via a rod 45 which extends through the tubular compensating piston 42, preferably with minimal radial play. The connection may be effected, for example, by means of electrical butt welding. Concentrical recesses 46—46 may be provided on both ends of the rod 45 for the purpose of orienting the two balls 38 and 44 relative to the rod 45. The control slide 40 may be connected to the ball 38, for example, by butt welding or, alternatively, it may be pressed against the ball 38 by means of a spring (not shown).

To ensure accurate coaxial alignment of the two balls 38 and 44 and of the periphery of the cylindrical control slide 40, the periphery can be finished by grinding after being welded to the other components. The component 14 has incorporated therein a sealing ring 47 which encloses the compensating piston 42 in a seal-tight manner such that upon overcoming the friction forces the compensating piston is longitudinally displaceable. A rigidly disposed ring 48 holds the sealing ring 47 in the component 14. A closing spring 49 presses against the second valve member 44 in the direction of the first valve seat 31 with a self-centering pressure piece 50 interpositioned therebetween. The closing spring 49 rests on the component 15 which is provided for this purpose with a pocket bore 51 designed to receive the closing spring 49, the pressure piece 50, the second valve member 44 and a portion of the compensating piston 42. The component 15 in turn rests on the component 13 via a retaining ring 52. Radial bores 53 which open into the bore 25 of the component 13 extend from the pocket bore 51 and thereby connect the pocket bore 51 to the connection bore 5.

The component 14 with the first valve seat 31, the first valve member 38, the rod 45, the second valve member 44 and the compensating piston 42 and also the second valve seat 43 and the seal 47 form a brake pressure build-up valve 54. With the addition of the control slide 40 this brake pressure build-up valve 54 constitutes a slide-controlled seat valve which, as is known, does not have any leakage in the closed state. The pressure from the pressure source 7 which is gradually communicated to the bore 30 through flow bores 27 and 28 and through unavoidable gaps between the cylindrical bore 30 and the cylindrical control slide 40, produces an essentially axial force compensation at the valve members 38 and 44 when the brake pressure build-up valve 54 is closed as a result of the essentially similar diameter of the valve seat 31 and the tubular compensating piston 42. In the course thereof the tubular compensating piston 42 is acted on in the direction of the second valve member 44 disposed without the cylindrical bore 30. As a result, the second valve seat 43 is pressed in a seal-tight manner against the second valve member 44 by the tubular compensating piston 42. In the course thereof, a frictional force of the sealing ring 47 is overcome. Only minimal forces transmissible by the control lug 39 to the first valve member 38 are required to raise this valve member 38 from its valve seat 31. As indicated, pressure compensation is always obtained between one portion of the cylindrical bore 30 and the other portion as a result of the configuration of the control slide 40 which comprises at least one pressure compensating channel 41. As the first valve member 38 is raised from its valve seat 31 the second valve member 44 is also raised via the rod 45. In this movement the second valve member 44 precedes the compensating piston 42 in the direction of the closing spring 49; the compensating piston 42 being slowed down by the seal 47. The advantage of this configuration of the brake pressure buildup valve according to the invention is that minor force is required to open the brake pressure build-up valve. This is advantageous in terms of the smooth opening of the valve seats 31 and 43 since initial break-away forces needed to displace the compensating piston 42 do not disrupt the opening.

Upon actuation of the control slide 18 by a force applied by the simulator spring 20, the valve element (ball) 38 is moved away from the valve seat 31. At the same time, the second valve element (ball) 44 that is firmly joined to the rod 45 is moved counter to the force of the closing spring 49. As a consequence, a briefly existing pressure excess on the end face of compensation piston 42 disposed in the axial direction moves the compensation piston 42 by a small amount, out of the space surrounded by the cylinder bore 30 into the space surrounded by the bore 51, in the direction of the valve element (ball) 44, but without touching the valve element (ball) 44.

During this process, the second valve element (ball) 44 moves away, spaced sufficiently far apart, from the valve seat 43 of the compensation piston 42, because the control slide 40 is moved by the control slide 18 and ball 38 into the brake pressure control valve 2 to open bore 29 to the pressure source for the purpose of pressure buildup in the brake system.

The resultant spacing, in the regulated state, between the second valve element (ball) 44 and the compensation piston 42, assures that the rod 45 can be actuated virtually without friction in the compensation piston 42, and the valve slide 40 can be actuated virtually without friction in the bore 30, and that a frictional force of the sealing element that must be overcome in the event of possible displacement of the compensation piston 42 does not become operative at the rod 45.

The cross-section of the tubular compensating piston 42 and the radial play between this piston and the rod 45 are so calculated that when influenced by pressure from the pressure source a pressure drop may be produced between the bore 30 and the valve seat 43 with the consequent displacement of the compensating piston 42 relative to the seal 47. When the brake pressure build-up valve 54 is later closed this displacement produces reliable seal-contact between the valve member 44 and its valve seat 43. In summary, the above-described configuration of the brake pressure build-up valve can also be characterized in that it consists in creating a force-compensated slide valve with a double valve seat seal wherein one of the valve seats is self-regulating. After the first valve member 38 has been raised from its valve seat 31 the control slide 40 advances in the direction of the seal 47 until it finally gradually uncovers the flow bores 29. In the course thereof, the brake pressure build-up valve 54 operates in the manner of a pressure-compensated slide valve which can be used in the known manner for the smooth regulation of pressure medium flows while employing only minimal control force. It should be added that the described combination of the first valve member 38 and its valve seat 31 and the cylindrical control slide 40 with the associated cylindrical bore 30 and the flow bores 29 is not limited to the use of the described tubular compensating piston 42 and its associated second valve member 44 and second valve seat 43.

The second valve element ball 44 serves to prevent leakage between the rod 45 and the compensation piston 42 in the non-braking position and the compensation piston lags 44, in order to release the pressure buildup between control slide 40 and the compensation piston.

In FIG. 2, which shows a section of an embodiment 2a, there is represented a component 14a which differs from component 14 shown in FIG. 1 in that longitudinal grooves 55 extend from its cylindrical bore 30. These longitudinal grooves 55 replace the pressure-compensating channels 41 of the control slide 40. As a result, in the embodiment 2a of FIG. 2, it is possible to employ a control slide 40a which does not have any breaks. Further ways of providing pressure compensation between the two slides of the control slide 40a consist in providing channels which extend through the component 14 (not shown).

The embodiment 2b shown in FIG. 3 differs from the one described first in that the compensating piston 42b is provided with a flange 57 in the proximity of its valve seat 43 and in that a spring 56 or other flexible element is incorporated between the flange 57 and the sealing ring 47. The spring 56 acts on the flange 57 and in the course thereof is supported on a ring 48b which retains the sealing ring 47 in an axial direction. When the brake pressure build-up valve 54b is closed, the flange 57 is axially spaced apart from a front face 58 of the component 13 which forms a stop for the flange 57 when the brake pressure build-up valve 54b is opened. After the valve 54b is opened this spring 56 pushes the compensating piston 42 and the valve seat 43 a short distance in the direction of the valve member 44. As a result, when the brake pressure build-up valve 54b is closed the valve member 44 encounters its valve seat 43 before the valve member 38 touches its valve seat 31 with the resulting advantage that seal-tight closure of the brake pressure build-up valve 54b is reliably obtained.

The flange 57 may be formed on the compensating piston 42b or, alternatively, as shown in FIG. 3, it may consist of a plate in the form of an elastically expandable retaining ring which is inserted in a circumferential groove 60 provided on the compensating piston 42b.

As indicated in the introduction, the use of balls as valve members 38 and 44 allows for the inexpensive production of the brake pressure build-up valve 54. These valve members can obviously also be replaced by differently formed valve members. For example, the first valve member 38, the control slide 40 and the rod 45 can be produced as a single piece. It would then merely be necessary to attach the second valve member 44 to the rod 45 after mounting the compensating piston 42.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States:

1. A brake pressure control valve comprising a brake pressure build-up valve having a valve chamber (30) with a first inner valve seat (31), a fluid pressure source connectable to said valve chamber, a movable first valve member in said valve chamber for cooperation with said valve seat, a movable compensating piston (42, 42b) associated with said first valve member, a sealing ring (47) surrounding said compensating piston and arranged to enclose a portion of said compensating piston in a seal-tight manner, said compensating piston (42, 42b) further including an end means arranged to project from said valve chamber, said end means adapted to form a second valve seat, a second valve member arranged to cooperate with said second valve seat, said second valve member being connected to said first valve member via a rod which extends through said compensating piston with minimal radial play and a closing spring for closing said first and second valve members, a relatively movable control slide having opposite sides disposed between said compensating piston and said first valve member, said control slide being connected to said first valve member, said valve chamber further provided with a cylindrical bore in proximity to said control slide and adapted for enclosure thereof and to thereby form a fixed control valve sleeve; said control slide and said control valve sleeve comprises flow bores adapted to form a control valve which may be opened after the first valve member has been removed from said first valve seat, and further wherein at least one pressure compensating channel is provided which produces pressure compensating between said opposite sides of said control slide.

2. A brake pressure control valve as claimed in claim 1, in which said at least one pressure compensating channel comprises a bore which extends through said control slide.

3. A brake control valve as claimed in claim 1, in which said at least one pressure conpensating channel comprises a longitudinal groove incorporated in said cylindrical bore.

4. A brake pressure control valve comprising a brake pressure build-up valve having a valve chamber (30) with a first inner valve seat (31), a fluid pressure source connectable to said valve chamber, a movable valve member in said valve chamber for cooperation with said valve seat, a movable compensating piston (42, 42b) associated with said valve member, a sealing ring (47) surrounding said compensating piston and arranged to enclose a portion of said compensating piston in a seal-tight manner, said compensating piston (42, 42b) further including an end means arranged to project from said valve chamber, said end means adapted to form a second valve seat, a second valve member arranged to cooperate with said second valve seat, said second valve member being connected to said first valve member via a rod which extends through said compensating piston with minimal radial play and a closing spring for closing said first and second valve members, said first and second valve members comprise ball members which are attached to said rod, a relatively movable control slide having opposite sides is disposed between said compensating piston and said first valve member, said control slide being connected to said first valve member, said valve chamber further provided with a cylindrical bore in proximity to said control slide and adapted for enclosure thereof and to thereby form a fixed control valve sleeve; said control slide and said control valve sleeve comprises flow bores adapted to form a control valve which may be opened after the first valve member has been removed from said first valve seat, and further wherein at least one pressure compensating channel is provided which produces pressure compensation between said opposite sides of said control slide.

5. A brake pressure control valve comprising a brake pressure build-up valve having a valve chamber (30) with a first inner valve seat (31), a fluid pressure source connectable to said valve chamber, a movable valve member in said valve chamber for cooperation with said valve seat, a movable compensating piston (42, 42b) associated with said valve member, a sealing ring (47) surrounding said compensating piston and arranged to enclose a portion of said compensating piston in a seal-tight manner, said compensating piston (42, 42b) further including an end means arranged to project from said valve chamber, said end means adapted to form a second valve seat, said second valve member being connected to said first valve member arranged to cooperate with said second valve seat, said second valve member being connected to said first valve member via a rod which extends through said compensating piston with a tight fit and a closing spring for closing said first and second valve members, said compensating piston which is displaceable relative to said sealing ring is influenced by a spring adapted to move said compensating piston a specific distance relative to the sealing ring and in the direction of the second valve member, a relatively movable control slide having opposite sides is disposed between said compensating piston and said first valve member, said control slide being connected to said first valve member, said valve chamber further provided with a cylindrical bore in proximity to said control slide and adapted for enclosure thereof and to thereby form a fixed control valve sleeve; said control slide and said control valve sleeve comprises flow bores adapted to form a control valve which may be opened after the first valve member has been removed from said first valve seat, and further wherein at least one pressure compensating channel is provided which produces pressure compensation between said opposite sides of said control slide.

* * * * *